(12) United States Patent
Liu et al.

(10) Patent No.: US 12,347,314 B2
(45) Date of Patent: Jul. 1, 2025

(54) VEHICLE SCHEDULING METHOD, APPARATUS, AND SYSTEM

(71) Applicant: BYD COMPANY LIMITED, Guangdong (CN)

(72) Inventors: Xiankuan Liu, Shenzhen (CN); Weihua Liu, Shenzhen (CN); Qiongying He, Shenzhen (CN); Meimei Xu, Shenzhen (CN)

(73) Assignee: BYD COMPANY LIMITED

( * ) Notice: Subject to any disclaimer, the term of this patent is extended or adjusted under 35 U.S.C. 154(b) by 355 days.

(21) Appl. No.: 17/914,376

(22) PCT Filed: Nov. 23, 2020

(86) PCT No.: PCT/CN2020/130803
§ 371 (c)(1),
(2) Date: Sep. 26, 2022

(87) PCT Pub. No.: WO2021/189882
PCT Pub. Date: Sep. 30, 2021

(65) Prior Publication Data
US 2023/0111516 A1    Apr. 13, 2023

(30) Foreign Application Priority Data
Mar. 27, 2020   (CN) .......................... 202010231852.7

(51) Int. Cl.
*G08G 1/0968*    (2006.01)
*G08G 1/16*    (2006.01)

(52) U.S. Cl.
CPC ....... *G08G 1/096833* (2013.01); *G08G 1/164* (2013.01)

(58) Field of Classification Search
CPC ........... G05D 1/0297; G08G 1/096827; G08G 1/163; G08G 1/096844; G08G 1/096833;
(Continued)

(56) References Cited

U.S. PATENT DOCUMENTS

| 9,880,562 B2 * | 1/2018 | Webber .................. G01S 19/53 |
| 2016/0033971 A1 * | 2/2016 | Thomson ............. G05D 1/0297 |
| | | 701/26 |

(Continued)

FOREIGN PATENT DOCUMENTS

| CN | 104464320 A | 3/2015 |
| CN | 107037812 A | 8/2017 |

(Continued)

OTHER PUBLICATIONS

International Search Report and Written Opinion for Application No. PCT/CN2020/130803, mailed on Feb. 22, 2021, 10 pages.

*Primary Examiner* — Navid Z. Mehdizadeh
*Assistant Examiner* — Jared C Bean

(57) ABSTRACT

A method includes: repeatedly performing following steps according to a preset scheduling period: receiving travelling information acquired by a target vehicle; searching, according to a global path of the target vehicle, a topological map for a target directed edge matching the travelling information; determining a right-of-way node sequence of the target vehicle according to the target directed edge and a coverage range of the target vehicle, where the right-of-way node sequence includes multiple right-of-way nodes, and the right-of-way nodes are nodes on the topological map; and determining right-of-way nodes matching the global path in the right-of-way node sequence as target right-of-way nodes in a case that each of the right-of-way nodes in the right-of-way node sequence is in a vacant, and sending the target right-of-way nodes to the target vehicle.

18 Claims, 10 Drawing Sheets

(58) Field of Classification Search
CPC ............. G08G 1/096811; G08G 1/164; G01C 21/3407
See application file for complete search history.

(56) References Cited

U.S. PATENT DOCUMENTS

| | | | |
|---|---|---|---|
| 2016/0138924 A1 | 5/2016 | An | |
| 2017/0017236 A1* | 1/2017 | Song | ..................... G08G 1/165 |
| 2020/0139964 A1* | 5/2020 | Kuninobu | ....... B60W 30/18154 |
| 2020/0333789 A1* | 10/2020 | Suzuki | ................ G05D 1/0212 |

FOREIGN PATENT DOCUMENTS

| | | |
|---|---|---|
| CN | 107179078 A | 9/2017 |
| CN | 108267149 A | 7/2018 |
| CN | 108829105 A | 11/2018 |
| CN | 109141449 A | 1/2019 |
| CN | 109144051 A | 1/2019 |
| CN | 109189081 A | 1/2019 |
| CN | 109597385 A | 4/2019 |
| CN | 109669456 A | 4/2019 |
| CN | 109916422 A | 6/2019 |
| CN | 110162058 A | 8/2019 |
| CN | 110619426 A | 12/2019 |
| KR | 100804489 B1 | 2/2008 |

\* cited by examiner

US 12,347,314 B2

VEHICLE SCHEDULING METHOD, APPARATUS, AND SYSTEM

CROSS-REFERENCE TO RELATED APPLICATIONS

This application is a national phase application of International Patent Application No. PCT/CN2020/130803, filed with the China National Intellectual Property Administration (CNIPA) on Nov. 23, 2020, which is based on and claims priority to and benefits of Chinese Patent Application No. 202010231852.7, entitled "VEHICLE SCHEDULING METHOD, APPARATUS AND SYSTEM" and filed on Mar. 27, 2020. The entire content of all of the above-referenced applications is incorporated herein by reference.

FIELD

The present disclosure relates to the field of electronic control, and more specifically, to a vehicle scheduling method, apparatus, and system.

BACKGROUND

The inventor finds that, in the related art, an autonomous vehicle needs to travel according to a path delivered by a control platform (or a control center) to perform a transport task. However, the control platform usually needs to control multiple autonomous vehicles in a same space. To avoid conflicts between autonomous vehicles and avoid the risk of collision, the path is usually planned based on a time window or a topological map, so that different execution times are allocated to different autonomous vehicles to avoid conflicts. As a result, the degree of coupling between the autonomous vehicles is high, and path resources cannot be fully used.

SUMMARY

To resolve problems existing in the related art, the present disclosure provides a vehicle scheduling method, apparatus, and system.

To achieve foregoing objectives, according to a first aspect of the embodiments of the present disclosure, a vehicle scheduling method is provided, the method including: repeatedly performing following steps according to a preset scheduling period:
  receiving travelling information acquired by a target vehicle;
  searching, according to a global path of the target vehicle, a topological map for a target directional path matching the travelling information;
  determining a right-of-way node sequence of the target vehicle according to the target directional path and a coverage range of the target vehicle, where the right-of-way node sequence includes a plurality of right-of-way nodes, and the right-of-way nodes are nodes on the topological map; and
  determining right-of-way nodes matching the global path in the right-of-way node sequence as target right-of-way nodes in a case that each of the right-of-way nodes in the right-of-way node sequence is in a vacant state, and sending the target right-of-way nodes to the target vehicle, so that the target vehicle travels according to a path indicated by the target right-of-way nodes.

In an embodiment, before the determining the right-of-way node sequence of the target vehicle according to the target directional path and the coverage range of the target vehicle, the method further includes:
  acquiring attribute information of the target vehicle from a preset database, where the attribute information includes: a vehicle length, a vehicle width, a maximum speed, and a maximum braking distance of the target vehicle;
  determining a coverage length according to the vehicle length, the maximum speed, and the maximum braking distance, determining a coverage width according to the vehicle width; and
  determining the coverage range according to the coverage length and the coverage width.

In an embodiment, the travelling information includes a current position coordinate, travelling angle, and travelling direction of the target vehicle, and the searching, according to the global path of the target vehicle, the topological map for the target directional path matching the travelling information includes:
  searching the topological map for a target node, where a Euclidean distance between the target node and the position coordinate is the shortest; and
  determining the target directional path from at least one adjacent path of the target node according to the global path, the travelling angle, and the travelling direction.

In an embodiment, the determining the target directional path from the at least one adjacent path of the target node according to the global path, the travelling angle, and the travelling direction includes:
  determining the first adjacent path as the target directional path in a case that a first adjacent path exists in the at least one adjacent path, where the first adjacent path belongs to the global path, a direction of the first adjacent path matches the travelling direction, and a distance between the position coordinate and the first adjacent path is less than a first distance threshold; and
  issuing first alarm information in a case that the first adjacent path does not exist in the at least one adjacent path, where the first alarm information indicates that a position of the target vehicle is abnormal.

In an embodiment, the determining the right-of-way node sequence of the target vehicle according to the target directional path and the coverage range of the target vehicle includes:
  determining nodes at two ends of the target directional path and nodes within the coverage range as the right-of-way node sequence.

In an embodiment, the determining the right-of-way nodes matching the global path in the right-of-way node sequence as the target right-of-way nodes in a case that each of the right-of-way nodes in the right-of-way node sequence is in the vacant state, and sending the target right-of-way nodes to the target vehicle includes:
  setting a state of each of the right-of-way nodes to an occupied state in a case that each of the right-of-way nodes in the right-of-way node sequence is in the vacant state;
  sequentially determining whether each of the right-of-way nodes in the right-of-way node sequence belongs to the global path;
  determining right-of-way nodes that belong to the global path as the target right-of-way nodes; and
  sending the target right-of-way nodes to the target vehicle in an order of the right-of-way node sequence.

In an embodiment, the method further includes:
  sending the historical target right-of-way nodes to the target vehicle in a case that there is a first right-of-way node in an occupied state in the right-of-way node sequence, so that the target vehicle travels according to a path indicated by the historical target right-of-way nodes, where the historical target right-of-way nodes are target right-of-way nodes sent to the target vehicle in a last scheduling period, and the first right-of-way node is any one of the right-of-way nodes in the right-of-way node sequence.

In an embodiment, the sending the historical target right-of-way nodes to the target vehicle in a case that there is a first right-of-way node in an occupied state in the right-of-way node sequence includes:

determining, in a case that there is a first right-of-way node in an occupied state in the right-of-way node sequence, an adjacent vehicle occupying the first right-of-way node;

determining whether a deadlock exists between the historical target right-of-way nodes and a global path of the adjacent vehicle;

sending the historical target right-of-way nodes to the target vehicle in a case that the deadlock does not exist between the historical target right-of-way nodes and the global path of the adjacent vehicle; and issuing second alarm information in a case that the deadlock exists between the historical target right-of-way nodes and the global path of the adjacent vehicle, where the second alarm information indicates that the global path of the target vehicle is abnormal.

In an embodiment, before the global path is allocated to the target vehicle, the method further includes:

searching, according to stationary information of the target vehicle, the topological map for a stationary directional path matching the stationary information, where the stationary information includes a stationary position and a stationary angle of the target vehicle;

determining a stationary right-of-way node sequence of the target vehicle according to the stationary directional path and a stationary coverage range of the target vehicle, where the stationary right-of-way node sequence includes a plurality of stationary right-of-way nodes, and the stationary right-of-way nodes are nodes on the topological map; and setting a state of each of the stationary right-of-way nodes in the stationary right-of-way node sequence to an occupied state.

In an embodiment, before the determining the stationary right-of-way node sequence of the target vehicle according to the stationary directional path and the stationary coverage range of the target vehicle, the method further includes:

determining the stationary coverage range according to the vehicle length and the vehicle width.

According to a second aspect of the embodiments of the present disclosure, a vehicle scheduling apparatus is provided, the apparatus including:

a receiving module, configured to receive travelling information acquired by a target vehicle;

a matching module, configured to search, according to a global path of the target vehicle, a topological map for a target directional path matching the travelling information;

a determining module, configured to determine a right-of-way node sequence of the target vehicle according to the target directional path and a coverage range of the target vehicle, where the right-of-way node sequence includes a plurality of right-of-way nodes, and the right-of-way nodes are nodes on the topological map; and a sending module, configured to determine right-of-way nodes matching the global path in the right-of-way node sequence as target right-of-way nodes in a case that each of the right-of-way nodes in the right-of-way node sequence is in a vacant state, and send the target right-of-way nodes to the target vehicle, so that the target vehicle travels according to a path indicated by the target right-of-way nodes.

In an embodiment, the determining module is further configured to:

acquire attribute information of the target vehicle from a preset database before the determining the right-of-way node sequence of the target vehicle according to the target directional path and the coverage range of the target vehicle, where the attribute information includes: a vehicle length, a vehicle width, a maximum speed, and a maximum braking distance of the target vehicle;

determine a coverage length according to the vehicle length, the maximum speed, and the maximum braking distance, determining a coverage width according to the vehicle width; and determine the coverage range according to the coverage length and the coverage width.

In an embodiment, the travelling information includes a current position coordinate, travelling angle, and travelling direction of the target vehicle, and the matching module includes:

a search submodule, configured to search the topological map for a target node, where a Euclidean distance between the target node and the position coordinate is the shortest; and a matching submodule, configured to determine the target directional path from at least one adjacent path of the target node according to the global path, the travelling angle, and the travelling direction.

In an embodiment, the matching submodule is configured to:

determine the first adjacent path as the target directional path in a case that a first adjacent path exists in the at least one adjacent path, where the first adjacent path belongs to the global path, a direction of the first adjacent path matches the travelling direction, and a distance between the position coordinate and the first adjacent path is less than a first distance threshold; and issue first alarm information in a case that the first adjacent path does not exist in the at least one adjacent path, where the first alarm information indicates that a position of the target vehicle is abnormal.

In an embodiment, the determining module is configured to:

determine nodes at two ends of the target directional path and nodes within the coverage range as the right-of-way node sequence.

In an embodiment, the vehicle scheduling apparatus is configured to repeatedly perform following steps according to a preset scheduling period: the steps from the receiving the travelling information acquired by the target vehicle to the determining the right-of-way nodes matching the global path in the right-of-way node sequence as the target right-of-way nodes in a case that each of the right-of-way nodes in the right-of-way node sequence is in the vacant state, and sending the target right-of-way nodes to the target vehicle.

In an embodiment, the sending module includes:

a judgment submodule, configured to set a state of each of the right-of-way nodes to an occupied state in a case that each of the right-of-way nodes in the right-of-way node sequence is in the vacant state;

the judgment submodule is further configured to sequentially determine whether each of the right-of-way nodes in the right-of-way node sequence belongs to the global path;

a determining submodule, configured to determine right-of-way nodes that belong to the global path as the target right-of-way nodes; and a sending submodule, configured to send the target right-of-way nodes to the target vehicle in an order of the right-of-way node sequence.

In an embodiment, the sending module is further configured to:

send the historical target right-of-way nodes to the target vehicle in a case that there is a first right-of-way node in an occupied state in the right-of-way node sequence, so that the target vehicle travels according to a path indicated by the historical target right-of-way nodes, where the historical target right-of-way nodes are target right-of-way nodes sent to the target vehicle in a last scheduling period, and the first right-of-way node is any one of the right-of-way nodes in the right-of-way node sequence.

In an embodiment, the sending module is further configured to:

determine, in a case that there is a first right-of-way node in an occupied state in the right-of-way node sequence, an adjacent vehicle occupying the first right-of-way node;

determine whether a deadlock exists between the historical target right-of-way nodes and a global path of the adjacent vehicle;

send the historical target right-of-way nodes to the target vehicle in a case that the deadlock does not exist between the historical target right-of-way nodes and the global path of the adjacent vehicle; and issue second alarm information in a case that the deadlock exists between the historical target right-of-way nodes and the global path of the adjacent vehicle, where the second alarm information indicates that the global path of the target vehicle is abnormal.

In an embodiment, the apparatus further includes:

a stationary matching module, configured to search, according to stationary information of the target vehicle, the topological map for a stationary directional path matching the stationary information before the global path is allocated to the target vehicle, where the stationary information includes a stationary position and a stationary angle of the target vehicle;

a stationary determining module, configured to determine a stationary right-of-way node sequence of the target vehicle according to the stationary directional path and a stationary coverage range of the target vehicle, where the stationary right-of-way node sequence includes a plurality of stationary right-of-way nodes, and the stationary right-of-way nodes are nodes on the topological map; and a processing module, configured to set a state of each of the stationary right-of-way nodes in the stationary right-of-way node sequence to an occupied state.

In an embodiment, the stationary determining module is further configured to:

determine the stationary coverage range according to the vehicle length and the vehicle width before the determining the stationary right-of-way node sequence of the target vehicle according to the stationary directional path and the stationary coverage range of the target vehicle.

According to a third aspect of the embodiments of the present disclosure, a vehicle scheduling system is provided, including at least one vehicle and a control platform. The control platform includes one or more processors and a storage apparatus configured to store one or more programs, the one or more programs, when executed by the one or more processors, causing the one or more processors to perform the steps of the method according to the first aspect.

According to the foregoing technical solutions, in the present disclosure, travelling information acquired by a target vehicle is first received, a topological map is searched, according to a global path of the target vehicle, for a target directed edge matching the travelling information. Then a right-of-way node sequence including multiple right-of-way nodes is determined according to the target directed edge and a coverage range of the target vehicle. Finally, in a case that each of the right-of-way nodes in the right-of-way node sequence is in a vacant state, target right-of-way nodes conforming to the global path are sent to the target vehicle to control the target vehicle to travel according to the target right-of-way nodes. According to the present disclosure, a corresponding position of a vehicle on a topological map is determined according to travelling information of the vehicle, so that a right-of-way node sequence can be occupied by the vehicle on the topological map is determined, and in a case that each right-of-way node in the right-of-way node sequence is not occupied, the vehicle is controlled to travel according to target right-of-way nodes in the right-of-way node sequence conforming to a global path.

Other features and advantages of the present disclosure will be described in detail in the following specific implementations.

BRIEF DESCRIPTION OF THE DRAWINGS

The accompanying drawings are provided for further understanding of the present disclosure and constitute a part of this specification, and explain the present disclosure together with the following specific implementations, but do not constitute a limitation to the present disclosure. In the accompanying drawings.

DETAILED DESCRIPTION

Embodiments are described in detail herein, and examples of the embodiments are shown in the accompanying drawings. When the following description involves the accompanying drawings, unless otherwise indicated, the same numerals in different accompanying drawings represent the same or similar elements. The implementations described in the following embodiments do not represent all implementations consistent with the present disclosure. On the contrary, the implementations are merely examples of apparatuses and methods that are described in detail in the appended claims and that are consistent with some aspects of the present disclosure.

Before the vehicle scheduling method, apparatus, and system provided in the present disclosure are described, application scenarios involved in the embodiments of the present disclosure are first described. The application scenario may be a vehicle scheduling system including multiple vehicles and a control platform. The control platform and the vehicles may be communicated with each other through any one of a gateway protocol, a wireless local area network (WLAN), vehicle information services (telematics), vehicle to everything (V2X), the 4th generation (4G) mobile communication technology, or the 5th generation (5G) mobile communication technology, to achieve the data transmission. The control platform may be, for example, a server, or may be a terminal device such as a notebook computer, a digital broadcast receiver, a personal digital assistant (PDA), a tablet computer (PAD), a portable multimedia player (PMP), an in-vehicle terminal (such as an in-vehicle navigation terminal), a desktop computer or the like. The vehicle may be any vehicle capable of communicating with the control platform and of being controlled by the control platform. For example, the vehicle may be an automated guided vehicle (AGV), or a car including an automatic driving module, where the car is not limited to a conventional car, a pure electric car, or a hybrid electric car, or the vehicle may be a vehicle that operates according to a preset rail such as a train, a metro, a light rail, a tramcar or the like.

Figure 1:
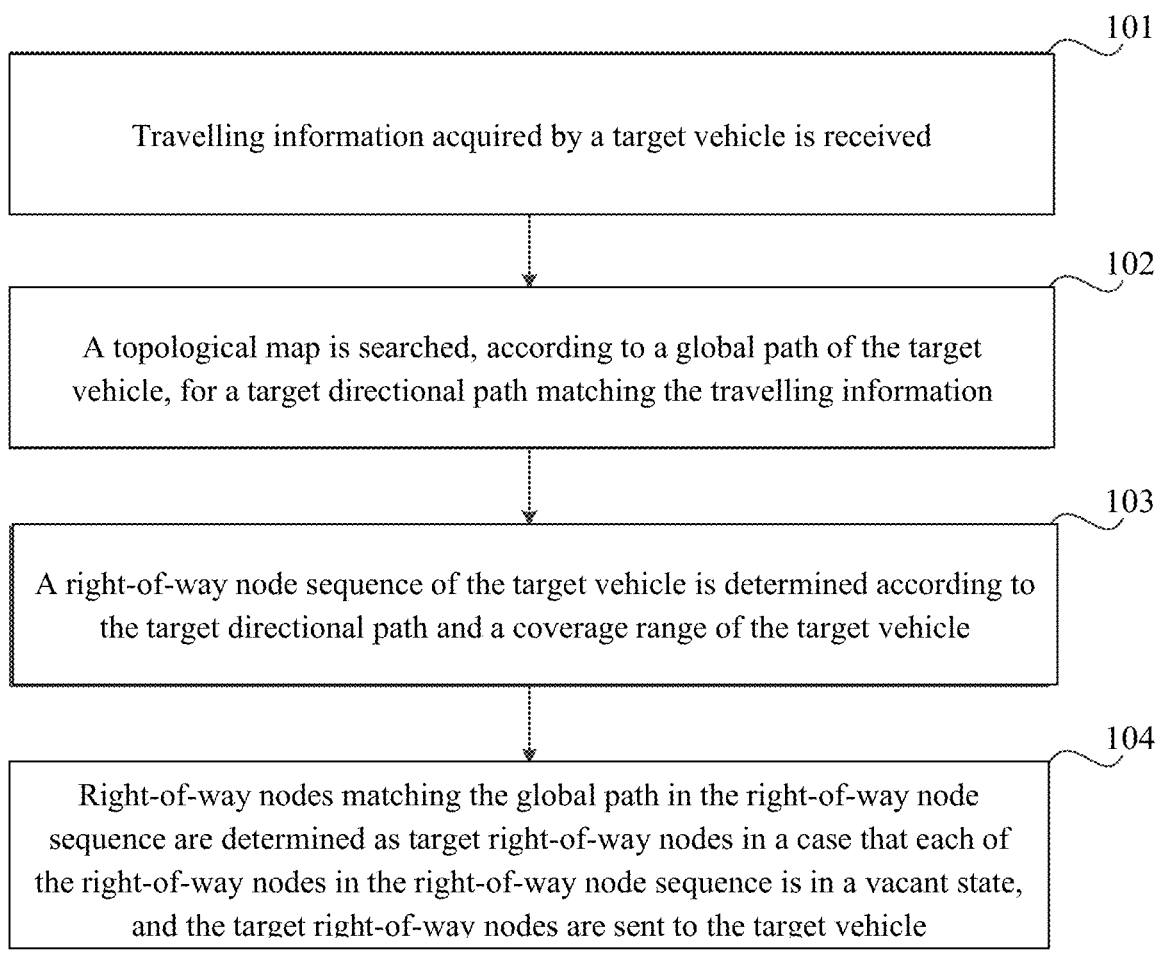
FIG. 1 is a flowchart of a vehicle scheduling method according to an embodiment.

FIG. 1 is a flowchart of a vehicle scheduling method according to an embodiment. As shown in FIG. 1, the method includes following steps:

Step 101: Travelling information acquired by a target vehicle is received.

For example, a positioning apparatus such as a lidar, a two-dimensional code label, an inertial navigation system or the like may be configured on the target vehicle, so that the travelling information can be acquired in real time, and the travelling information can be reported to the control platform. The target vehicle may be any one of the vehicles controllable by the control platform. The travelling information of the target vehicle can reflect a current travelling state of the target vehicle, and may include, for example, a current position coordinate, a travelling angle (which may be a heading angle), and travelling direction of the target vehicle.

Step 102: A topological map is searched, according to a global path of the target vehicle, for a target directional path matching the travelling information.

Step 103: A right-of-way node sequence of the target vehicle is determined according to the target directional path and a coverage range of the target vehicle, where the right-of-way node sequence includes multiple right-of-way nodes, and the right-of-way nodes are nodes on the topological map.

For example, the control platform manages multiple vehicles, and can allocate a global path for each vehicle during the task assignment. The global path may indicate an overall travelling path for each vehicle, which is determined by the control platform with a preset global path planning algorithm according to a task (that is, an origin and a destination) needs to be completed by each vehicle and the topological map. The global path planning algorithm may be, for example, an A* (which is also referred to as A-Star) algorithm, a Dijkstra algorithm, or the like, which is not limited in the present disclosure. After acquiring the travelling information acquired by a current target vehicle, the control platform may search the topological map for the target directional path matching the travelling information according to a global path pre-allocated to the target vehicle. Such a step may determine a position of the target vehicle on the topological map according to the travelling information. The position coordinate indicated in the travelling information is a Cartesian coordinate system. The topological map is an abstract map, a directed graph, and includes multiple nodes and a directional path formed by the nodes. Therefore, coordinates in the Cartesian coordinate system needs to be converted to the topological map, to obtain a position where the target vehicle is currently located on the topological map. A directional path where the target vehicle is currently located is the target directional path. The target directional path may be represented by nodes at two ends, where the directional path may be a path determined to be directional by taking two nodes on the topological map as a start point and an end point. The direction of the directional path points from the start point to the end point.

After the target directional path is determined, the right-of-way node sequence of the target vehicle may further be determined according to the coverage range of the target vehicle. It may be understood that, the right-of-way node sequence includes all nodes that may be currently used by the target vehicle, and each node in the right-of-way node sequence may be referred to as a right-of-way node. The coverage range of the target vehicle may be a maximum area that may be affected by a vehicle body of the target vehicle by travelling forward or backward, which may be determined according to attribute information of the target vehicle. The attribute information may be pre-stored in the control platform. Alternatively, the attribute information may be stored in a specified database, and the control platform acquires the attribute information of the target vehicle from the database when needed. The attribute information may include, for example, information such as a vehicle length, a vehicle width, a speed or the like.

Specifically, the right-of-way node sequence includes nodes at two ends of the target directional path and nodes within the coverage range of the target vehicle. To improve safety of controlling the target vehicle, the right-of-way node sequence may further be expanded to some extent based on the nodes at the two ends of the target directional path and the nodes within the coverage range. For example, multiple intersecting arc lines are usually provided on the topological map, which is convenient for a vehicle to make a turn. Compared with straight travelling, the turning process occupies more nodes. In addition, an intersection of the multiple arc lines is not necessarily a node on the topological map, and a position of the intersection is difficult to be accurately determined. Therefore, during topological map construction, an association relationship may be established in advance for a region where the arc lines are intersected, so that the intersecting arc lines are associated with each other. In this way, in a case there is an arc line associated with the directional path where the nodes at the two ends of the directional path or the nodes within the coverage range are located, nodes at two ends of the arc line associated with the directional path may also be added to the right-of-way node sequence, thereby avoiding a conflict between the target vehicle and another vehicle in the turning process.

Step 104: Right-of-way nodes matching the global path in the right-of-way node sequence are determined as target right-of-way nodes in a case that each of the right-of-way nodes in the right-of-way node sequence is in a vacant state, and the target right-of-way nodes are sent to the target vehicle, so that the target vehicle travels according to a path indicated by the target right-of-way nodes.

For example, whether each of the right-of-way nodes in the right-of-way node sequence is occupied by another vehicle needs to be determined, to enable the target vehicle to flexibly adjust a local path based on the global path, so that the target vehicle may not be in conflict with the another vehicle managed by the control platform. In a case that each of the right-of-way nodes is in the vacant state, it represents that there is no other vehicles occupying the right-of-way nodes in the right-of-way node sequence. In this case, the right-of-way nodes in the right-of-way node sequence matching the global path may be determined as the target right-of-way nodes. The right-of-way node sequence may include two types of right-of-way nodes. One type of right-of-way nodes belongs to the global path, that is, the target right-of-way nodes. It may be understood that the target right-of-way nodes form the local path conforming to the planning of the global path. The target right-of-way nodes may be, for example, the nodes at the two ends of the directional path, or may be nodes included in multiple directional paths that are connected in sequence. The other type of right-of-way nodes does not belong to the global path. Such type of right-of-way nodes may be protection nodes, that is, nodes that may be touched by the vehicle body when the target vehicle travels according to the target right-of-way nodes. Finally, the target right-of-way nodes are sent to the target vehicle, so that the target vehicle travels according to the path indicated by the target right-of-way nodes.

In this way, processes of adjusting a travelling path in real time for the target vehicle based on the global path and determining target right-of-way nodes of each vehicle are independent from each other, and there is no need to prejudge whether there is a conflict between the vehicles. In addition, each of the right-of-way nodes in the right-of-way node sequence is not occupied by other vehicles, so that it can be ensured that there is no conflict between the target right-of-way nodes of each vehicle. Therefore, a degree of coupling between vehicles can be reduced while each vehicle can be ensured to travel safely, thereby improving usage efficiency of the path.

Based on the above, in the present disclosure, travelling information acquired by a target vehicle is first received, a topological map is searched, according to a global path of the target vehicle, for a target directional path matching the travelling information. Then a right-of-way node sequence including multiple right-of-way nodes is determined according to the target directional path and a coverage range of the target vehicle. Finally, in a case that each of the right-of-way nodes in the right-of-way node sequence is in a vacant state, target right-of-way nodes conforming to the global path are sent to the target vehicle to control the target vehicle to travel according to the target right-of-way nodes. According to the present disclosure, a corresponding position of a vehicle on a topological map is determined according to travelling information of the vehicle, so that a right-of-way node sequence can be occupied by the vehicle on the topological map is determined. Finally, in a case that each right-of-way node in the right-of-way node sequence is not occupied, the vehicle is controlled to travel according to target right-of-way nodes in the right-of-way node sequence conforming to a global path, so that, based on the global path, a travelling path can be adjusted for each vehicle in real time without prejudging whether there is a conflict between vehicles to avoid the risk, thereby reducing a degree of coupling between the vehicles and improving usage efficiency of the path.

In an embodiment, in an implementation, steps 101 to 104 may be repeatedly performed according to a preset scheduling period. For example, a target vehicle acquires travelling information according to a preset scheduling period (for example, 100 ms) and periodically reports the travelling information to a control platform, so that the control platform can control, according to the scheduling period, the target vehicle to travel. For example, after allocating a global path to each vehicle, the control platform may start to adjust a local path, that is, target path nodes of each vehicle according to the scheduling period, thereby controlling the travelling of the vehicle until the vehicle travels to a destination indicated by the global path.

Figure 2:
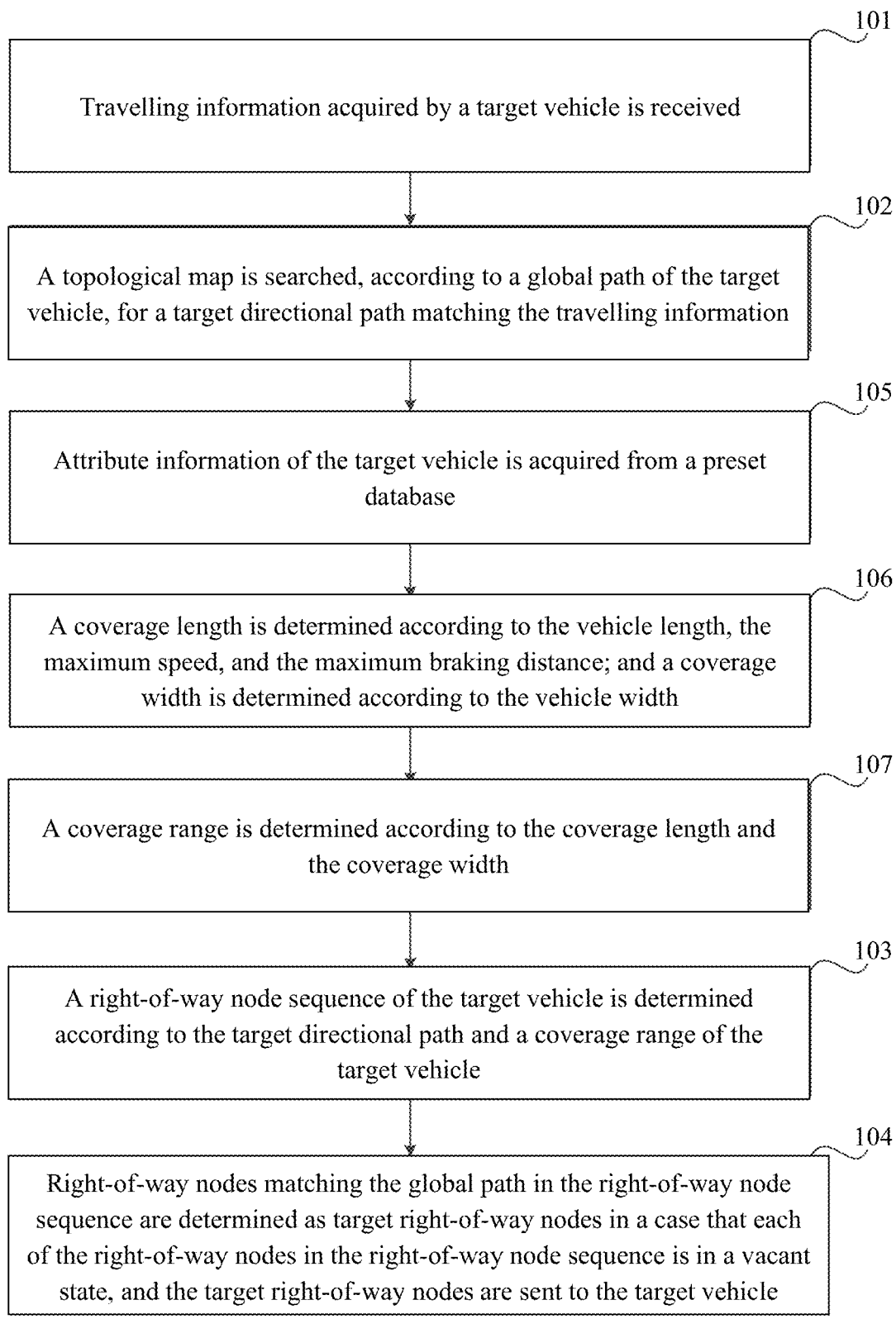
FIG. 2 is a flowchart of another vehicle scheduling method according to an embodiment.

FIG. 2 is a flowchart of a vehicle scheduling method according to another embodiment. As shown in FIG. 2, before step 103, the method may further include following steps.

Step 105: Attribute information of the target vehicle is acquired from a preset database, where the attribute information includes: a vehicle length, a vehicle width, a maximum speed, and a maximum braking distance of the target vehicle.

Step 106: A coverage length is determined according to the vehicle length, the maximum speed, and the maximum braking distance; and a coverage width is determined according to the vehicle width.

Step 107: A coverage range is determined according to the coverage length and the coverage width.

In a specific application scenario, the coverage range of the target vehicle may be pre-stored in the control platform. Alternatively, the control platform may acquire the attribute information of the target vehicle from the database when requiring the coverage range of the target vehicle for use, to calculate the coverage range of the target vehicle in real time. For example, the coverage length may be determined according to the vehicle length, the maximum speed, and the maximum braking distance, the coverage width may be determined according to the vehicle width, and finally the coverage range may be determined according to the coverage length and the coverage width. The coverage range may be a rectangular region taking the coverage length as a length and taking the coverage width as a width. A coverage length $RR\_L$ of the target vehicle may be calculated through the following formulas:

$$RR\_L = RR\_BL + RR\_FL$$

$$RR\_FL = VE\_L + VE\_STOP\_L + VE\_L\_V * RR\_T$$

$$RR\_BL = VE\_L$$

A coverage width RR_W may be calculated through the following formula:

$$RR\_W = VE\_W$$

Figure 3:
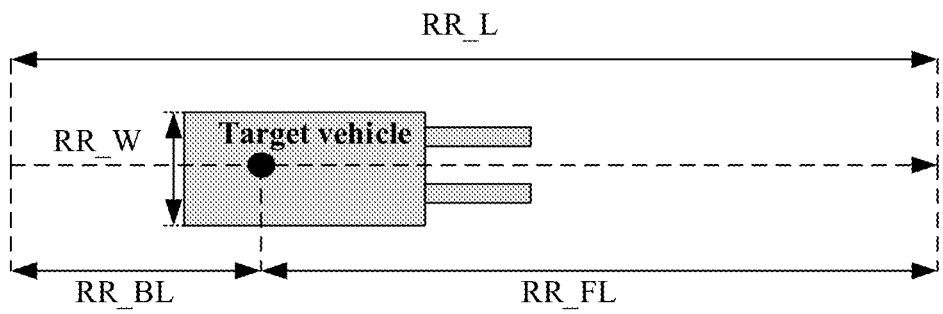
FIG. 3 is a schematic diagram of a coverage range of a target vehicle according to an embodiment.

RR_FL represents a forward length, RR_BL represents a backward length, VE_L represents a vehicle length, VE_W represents a vehicle width, VE_STOP_L represents a maximum braking distance, VE_L_V represents a maximum speed, and RR_T represents a scheduling period. As shown in FIG. 3, the coverage length RR_L is a maximum length that may be affected by the target vehicle in a dimension of a travelling direction. The coverage width RR_W is a maximum length that may be affected by the target vehicle in a dimension perpendicular to the travelling direction.

Figure 4:
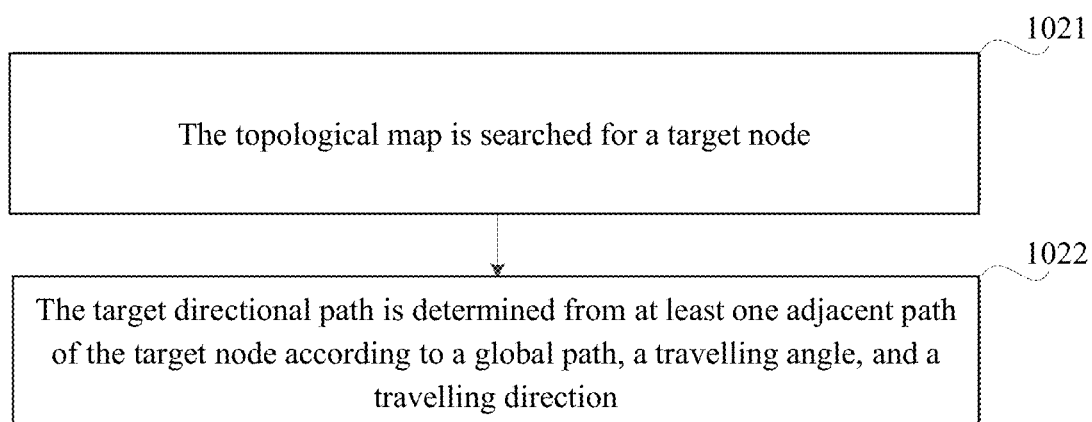
FIG. 4 is a flowchart of another vehicle scheduling method according to an embodiment.

FIG. 4 is a flowchart of a vehicle scheduling method according to another embodiment. As shown in FIG. 4, the travelling information includes a current position coordinate, travelling angle, and travelling direction of the target vehicle. An implementation of step 102 may include:

Step 1021: The topological map is searched for a target node, where a Euclidean distance between the target node and the position coordinate is the shortest.

Step 1022: The target directional path is determined from at least one adjacent path of the target node according to a global path, a travelling angle, and a travelling direction.

For example, the travelling information may include the current position coordinate, the travelling angle, and the travelling direction of the target vehicle. The position coordinate may be a coordinate in the Cartesian coordinate system, the travelling angle may be a heading angle, and the travelling direction may be forward, backward, or stopping. To determine the position of the target vehicle on the topological map, the position coordinate may be first converted to the topological map according to a conversion relationship between the Cartesian coordinate system and the topological map, and the topological map is searched for the target node having a shortest Euclidean distance to the position coordinate, that is, a node on the topological map closest to the target vehicle. Then, the target directional path is searched from the adjacent path of the target node. The adjacent path is a directional path taking the target node as an end point of one end, where the target node may include one or more adjacent paths.

Specifically, the manner of determining the target directional path described in step 1022 may include:

determining the first adjacent path as the target directional path in a case that a first adjacent path exists in the at least one adjacent path, where the first adjacent path belongs to the global path, a direction of the first adjacent path matches the travelling direction, and a distance between the position coordinate and the first adjacent path is less than a first distance threshold.

The target directional path represents a directional path where the target vehicle is currently located. Therefore, three conditions need to be met. First condition: the target directional path belongs to the global path, that is, the target directional path conforms to the planning of the global path. Second condition: the direction of the target directional path matches the travelling direction, that is, the direction of the target directional path matches the travelling direction of the target vehicle. Third condition: the distance between the target directional path and the position coordinate is less than the first distance threshold, that is, the distance between the target vehicle and the target directional path cannot be excessively long. The first distance threshold may be set according to specific requirements, and different first distance thresholds may add a degree of redundancy in the process of matching, for example, the first distance threshold may be set to 500 mm.

First alarm information is issued in a case that the first adjacent path does not exist in the at least one adjacent path, where the first alarm information indicates that a position of the target vehicle is abnormal.

The first alarm information is issued in a case that there is no adjacent path meeting the foregoing three conditions in the at least one adjacent path of the target node, where the first alarm information indicates that the position of the target vehicle is abnormal. It may be understood that, there is no target directional path matching the target vehicle being found on the topological map, which may be caused by incorrect travelling information acquired by the target vehicle, or may be caused by a fault occurring during travelling of the target vehicle. The target vehicle may be controlled to stop a current task, that is, stop travelling while the first alarm information is issued, to enable a management personnel to process the first alarm information.

Figure 5:
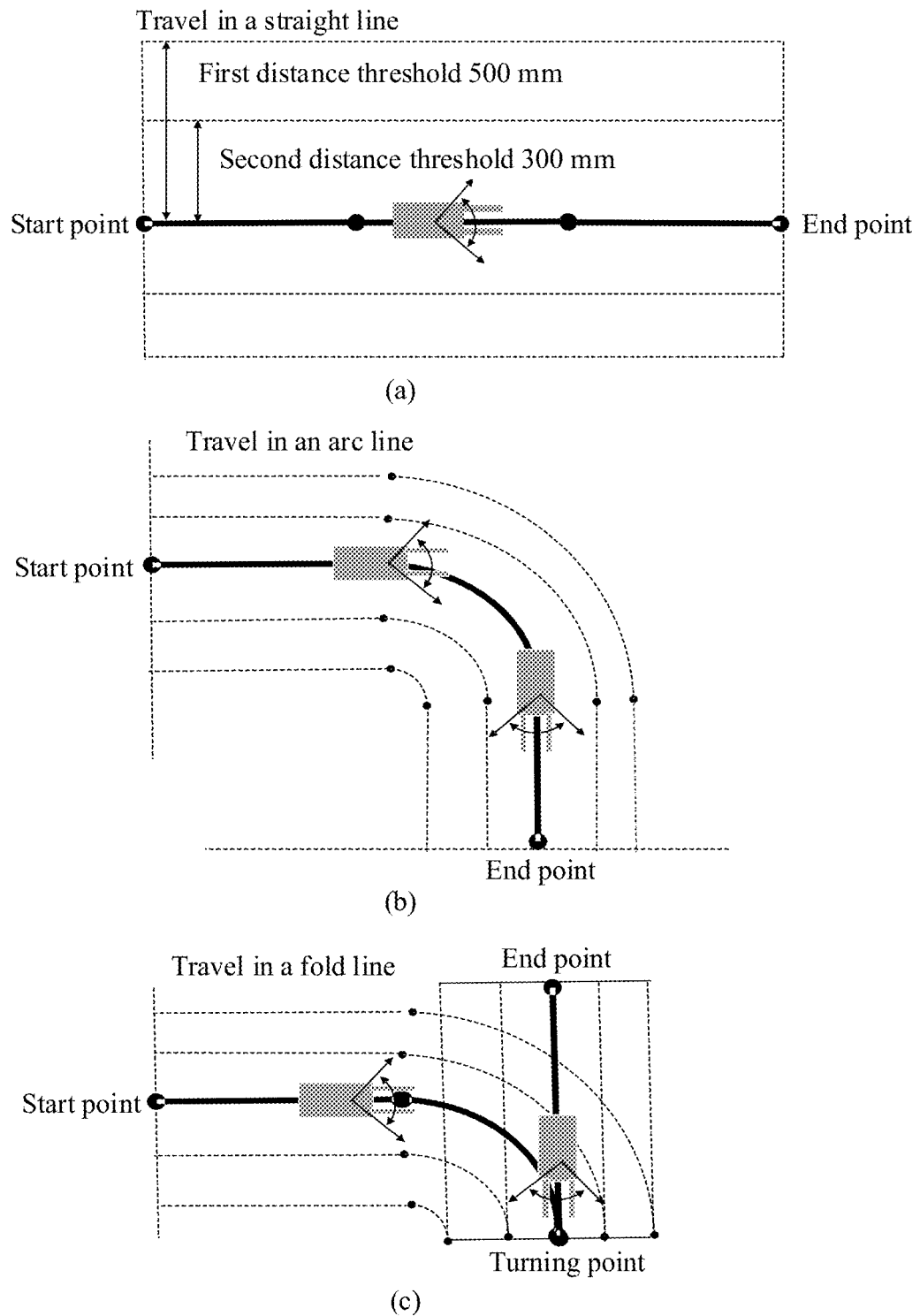
FIG. 5 is a schematic diagram of a travelling scenario according to an embodiment.

In addition, multiple distance thresholds may be set to improve the degree of redundancy in the process of matching. For example, a second distance threshold (for example, 300 mm) may also be set. Prompt information is first issued in a case that the distance between the target directional path and the position coordinate is greater than or equal to the second distance threshold and less than the first distance threshold, to prompt the management personnel to pay attention to the target vehicle. In a case that the distance between the target directional path and the position coordinate is greater than or equal to the first distance threshold, the first alarm information is issued and the target vehicle is controlled to stop travelling. Taking a travelling scenario shown in FIG. 5 as an example, (a) of FIG. 5 shows a schematic diagram of a travelling scenario in which a target vehicle currently travels in a straight line, and the target directional path may be determined as from a start point to an end point within a first threshold range; (b) of FIG. 5 shows a schematic diagram of a travelling scenario in which a target vehicle currently travels in an arc line, and the target directional path may be determined as from a start point to an end point within the first threshold range; and (c) of FIG. 5 shows a schematic diagram of a travelling scenario in which a target vehicle currently travels in a fold line, and the target directional path may be determined from a start point to a turning point, and from the turning point to an end point within the first threshold range.

Figure 6:
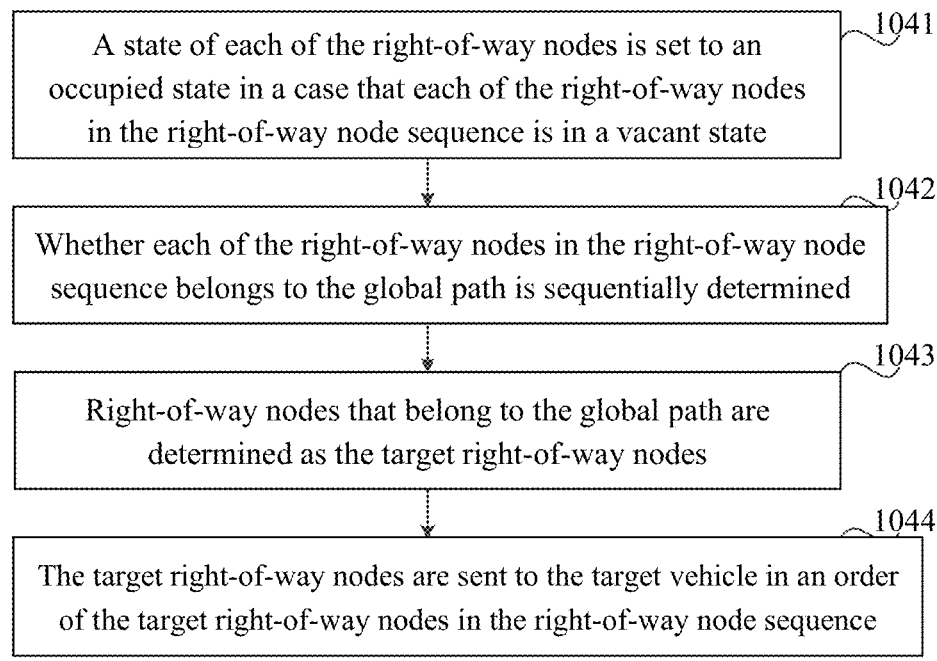
FIG. 6 is a flowchart of a vehicle scheduling method according to another embodiment.

FIG. 6 is a flowchart of a vehicle scheduling method according to another embodiment. As shown in FIG. 6, step 104 may further include following steps:

Step 1041: A state of each of the right-of-way nodes is set to an occupied state in a case that each of the right-of-way nodes in the right-of-way node sequence is in a vacant state.

Step 1042: Whether each of the right-of-way nodes in the right-of-way node sequence belongs to the global path is sequentially determined.

Step 1043: Right-of-way nodes that belong to the global path are determined as the target right-of-way nodes.

Step 1044: The target right-of-way nodes are sent to the target vehicle in an order of the target right-of-way nodes in the right-of-way node sequence.

For example, whether each of the right-of-way nodes in the right-of-way node sequence is occupied by another vehicle may be sequentially determined, to avoid a conflict between the target vehicle and the another vehicle managed by the control platform. A specific implementation may be respectively comparing the right-of-way node sequence of the target vehicle with a right-of-way node sequence of the another vehicle, to determine whether there is a repeated right-of-way node. Since there are a relatively large quantity of vehicles managed by the control platform, the calculation amount of respectively comparing with the right-of-way node sequence of the another vehicle may be huge, and time complexity is $O(n^2)$, making it difficult to ensure real-time performance of vehicle control.

Therefore, a node lock may be added for each node on the topological map, and each node lock is initially in a vacant state. After determining a corresponding right-of-way node sequence, the target vehicle determines whether each of the right-of-way nodes in the right-of-way node sequence is in the vacant state, where each of the right-of-way node being in the vacant state represents that each of the right-of-way node is not occupied by other vehicles in a current scheduling period, and then sets the state of each of the right-of-way nodes to the occupied state. In this way, the another vehicle cannot use right-of-way nodes in the right-of-way node sequence corresponding to the target vehicle in the current scheduling period. Therefore, the calculation amount of comparing the right-of-way node sequence may be significantly reduced, and the calculation speed may reach a level of millisecond. Then, the right-of-way nodes belong to the global path are determined as the target right-of-way nodes, and the target right-of-way nodes form the local path conforming to the planning of the global path. Finally, the target right-of-way nodes are sent to the target vehicle in the order of the target right-of-way nodes in the right-of-way node sequence. The order of the target right-of-way nodes in the right-of-way node sequence may be an order of executing the target right-of-way nodes by the target vehicle. In a case that the target right-of-way nodes are nodes at two ends of one directional path, the order of the target right-of-way nodes in the right-of-way node sequence is from a start point to an end point of the directional path. In a case that the target right-of-way nodes are nodes included in multiple directional paths that are connected in sequence, the order of the target right-of-way nodes in the right-of-way node sequence is an order of sequentially connecting the multiple directional paths.

Figure 7:
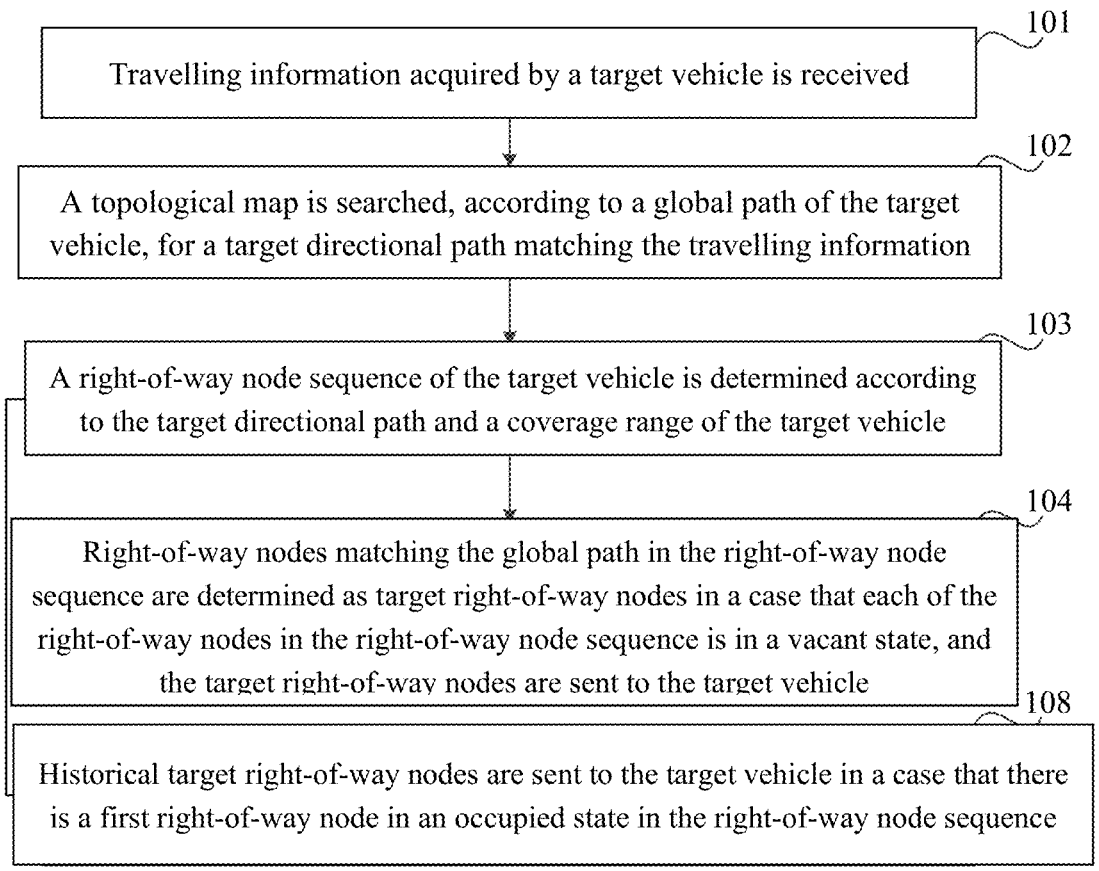
FIG. 7 is a flowchart of a vehicle scheduling method according to another embodiment.

FIG. 7 is a flowchart of another vehicle scheduling method according to an embodiment. As shown in FIG. 7, the method may further include following steps.

Step 108: Historical target right-of-way nodes are sent to the target vehicle in a case that there is a first right-of-way node in an occupied state in the right-of-way node sequence, so that the target vehicle travels according to a path indicated by the historical target right-of-way nodes, where the historical target right-of-way nodes are target right-of-way nodes sent to the target vehicle in a last scheduling period, and the first right-of-way node is any one of the right-of-way nodes in the right-of-way node sequence.

Further, in a case that there is a first right-of-way node in an occupied state in the right-of-way node sequence, it indicates that the first right-of-way node is used by another vehicle in a current scheduling period. In other words, in a case that the target vehicle travels according to the target right-of-way nodes in the right-of-way node sequence, the target vehicle may be in conflict with the vehicle using the first right-of-way node. In this case, the historical target right-of-way nodes determined in the last scheduling period may be resent to the target vehicle, so that the target vehicle may travel according to the path indicated by the historical target right-of-way nodes.

Figure 8:
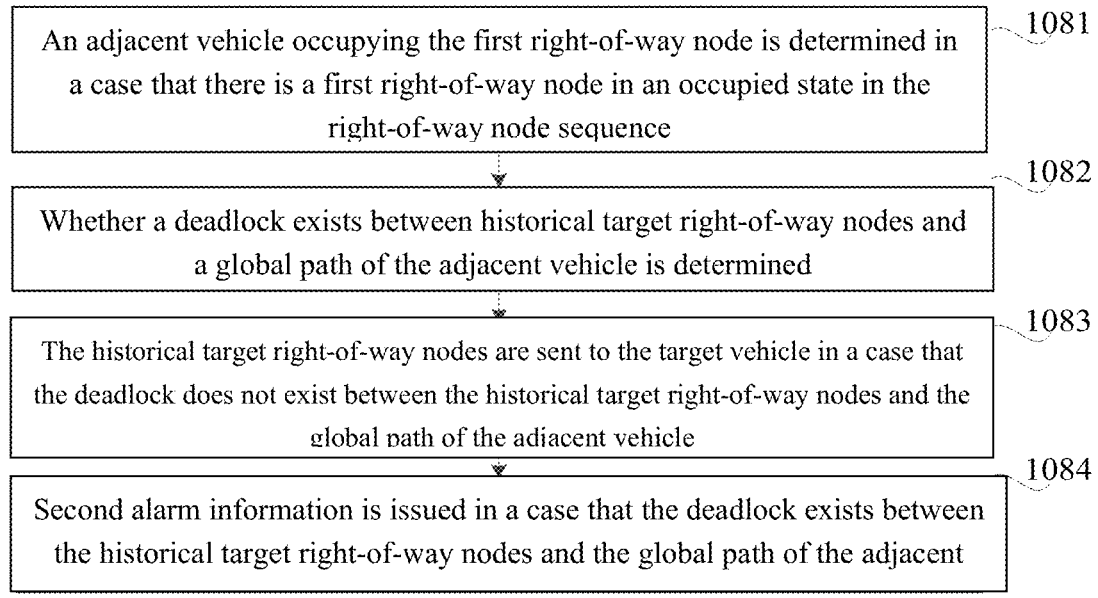
FIG. 8 is a flowchart of a vehicle scheduling method according to another embodiment.

FIG. 8 is a flowchart of a vehicle scheduling method according to another embodiment. As shown in FIG. 8, an implementation of step 108 may include following steps:

Step 1081: An adjacent vehicle occupying the first right-of-way node is determined in a case that there is a first right-of-way node in an occupied state in the right-of-way node sequence.

Step 1082: Whether a deadlock exists between historical target right-of-way nodes and a global path of the adjacent vehicle is determined.

Step 1083: The historical target right-of-way nodes are sent to the target vehicle in a case that the deadlock does not exist between the historical target right-of-way nodes and the global path of the adjacent vehicle.

Step 1084: Second alarm information is issued in a case that the deadlock exists between the historical target right-of-way nodes and the global path of the adjacent vehicle, where the second alarm information indicates that the global path of the target vehicle is abnormal.

In a specific application scenario, an adjacent vehicle occupying the first right-of-way node may be first determined, where the adjacent vehicle is a vehicle that may be in conflict with the target vehicle. Then, whether the deadlock exists between the historical target right-of-way nodes determined in the last scheduling period and the global path of the adjacent vehicle is determined. Specifically, in a case that the path indicated by the historical target right-of-way nodes overlaps with the global path of the adjacent vehicle, it indicates that the target vehicle may still pass through the global path of the adjacent vehicle even if travelling according to the path indicated by the historical target right-of-way nodes, and it is determined that the deadlock exists between the historical target right-of-way nodes and the global path of the adjacent vehicle. In a case that the path indicated by the historical target right-of-way nodes does not overlap with the global path of the adjacent vehicle, it is determined that the deadlock does not exist between the historical target right-of-way nodes and the global path of the adjacent vehicle.

Figure 9:
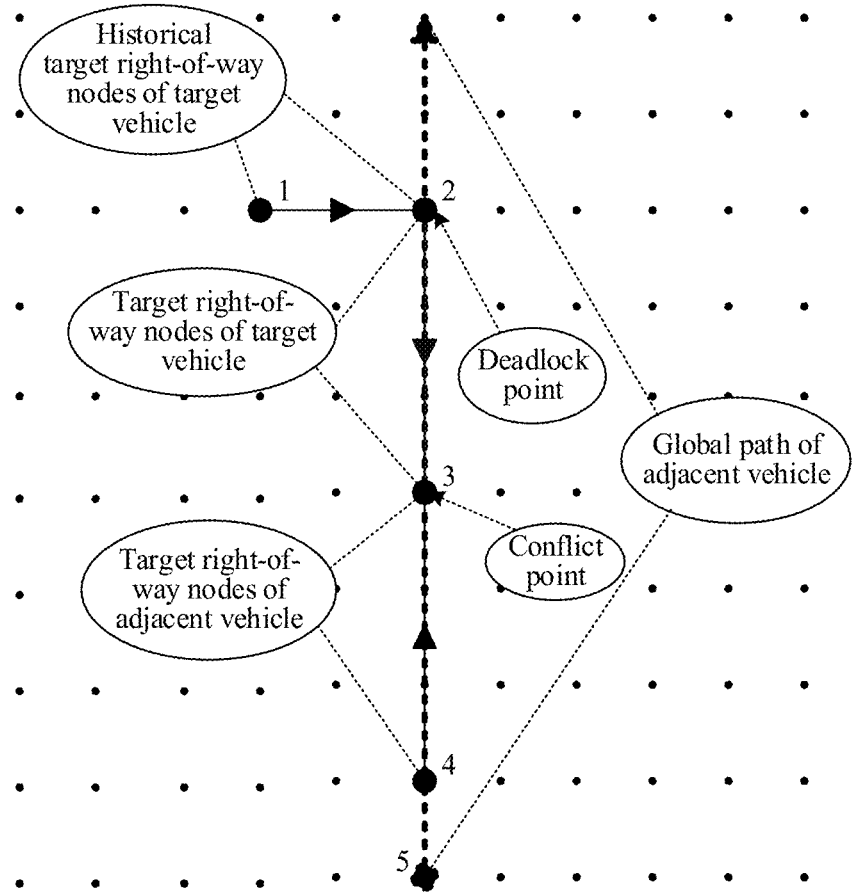
FIG. 9 is a schematic diagram of a travelling path of a target vehicle and an adjacent vehicle according to an embodiment.

As shown in FIG. 9, target right-of-way nodes included in the right-of-way node sequence determined by the target vehicle in a current scheduling period include: a node 2 and a node 3. In this case, the node 3 simultaneously belongs to target right-of-way nodes (which are the node 3 and a node 4) of the adjacent vehicle, and the node 3 is a conflict point. In this case, historical target right-of-way nodes determined by the target vehicle in a last scheduling period are the node 1 and the node 2, but a global path (which includes the node 1, the node 2, the node 3, the node 4, and a node 5) of the adjacent vehicle still includes the node 2, it indicates that the target vehicle may still pass through the global path of the adjacent vehicle even if travelling according to the node 1 and the node 2, and the node 2 is a deadlock point. In this case, it is determined that the deadlock exists between the historical target right-of-way nodes of the target vehicle and the global path of the adjacent vehicle.

The historical target right-of-way nodes are sent to the target vehicle in a case that the deadlock does not exist between the historical target right-of-way nodes and the global path of the adjacent vehicle, so that the target vehicle travels according to the path indicated by the historical target right-of-way nodes. The second alarm information is issued in a case that the deadlock does not exist between the historical target right-of-way nodes and the global path of the adjacent vehicle, where the second alarm information indicates that the global path of the target vehicle is abnormal. After receiving the second alarm information, the control platform may re-plan a new global path for the target vehicle. In a case that there is no way to re-plan the new global path, the second alarm information may be reported to the management personnel to adjust the global path through manual intervention.

Figure 10:
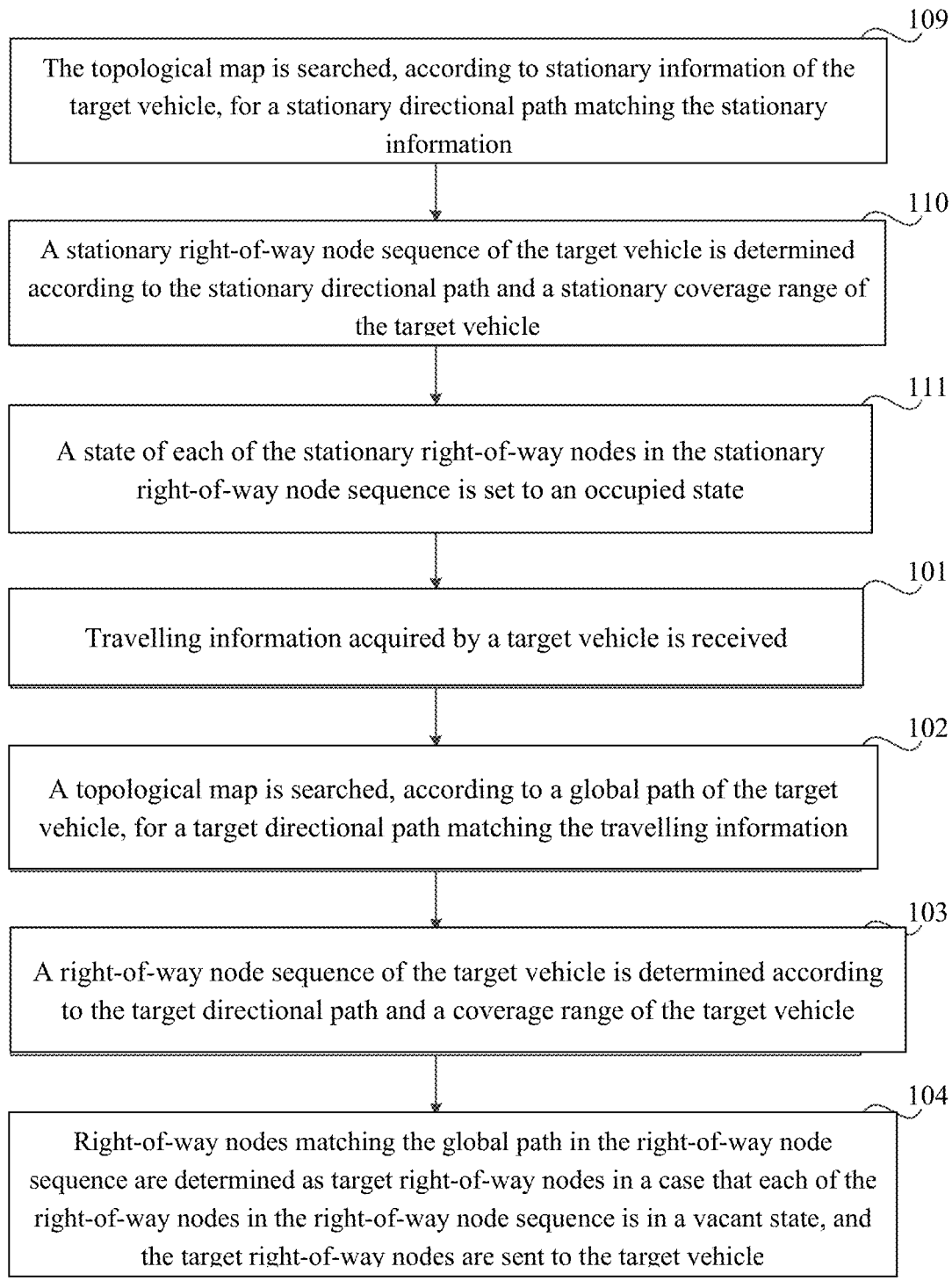
FIG. 10 is a flowchart of a vehicle scheduling method according to another embodiment.

FIG. 10 is a flowchart of another vehicle scheduling method according to an embodiment. As shown in FIG. 10, before the global path is allocated to the target vehicle, the method may further include:

Step 109: The topological map is searched, according to stationary information of the target vehicle, for a stationary directional path matching the stationary information, where the stationary information includes a stationary position and a stationary angle of the target vehicle.

Step 110: A stationary right-of-way node sequence of the target vehicle is determined according to the stationary directional path and a stationary coverage range of the target vehicle, where the stationary right-of-way node sequence includes multiple stationary right-of-way nodes, and the stationary right-of-way nodes are nodes on the topological map.

Step 111: A state of each of the stationary right-of-way nodes in the stationary right-of-way node sequence is set to an occupied state.

For example, before the control platform allocates the global path to the target vehicle, there is no task allocated to the target vehicle, that is, the target vehicle is currently in a stationary state and may not move. In this case, the topological map may be searched for the stationary directional path matching the stationary information according to the stationary information of the target vehicle, and then the stationary right-of-way node sequence of the target vehicle may be determined according to the stationary directional path and the stationary coverage range of the target vehicle. Wherein, the stationary information includes the stationary position and the stationary angle of the target vehicle, and a position of the target vehicle on the topological map may be determined according to the stationary position and the stationary angle of the target vehicle. The stationary position is a coordinate in the Cartesian coordinate system. Therefore, coordinates in the Cartesian coordinate system needs to be converted to the topological map, to obtain a position where the target vehicle is located on the topological map. A directional path where the target vehicle is stationary is the stationary directional path, and the stationary directional path may be represented by nodes at two ends of the stationary directional path.

After the stationary directional path is determined, the stationary right-of-way node sequence of the target vehicle may further be determined according to the stationary coverage range of the target vehicle. It may be understood that, the stationary right-of-way node sequence includes all nodes that may be covered in a stationary state of the target vehicle, which may include nodes at two ends of the stationary directional path, and may further include nodes within the stationary coverage range of the target vehicle. Each node in the stationary right-of-way node sequence may be referred to as a stationary right-of-way node. The stationary coverage range of the target vehicle may be a maximum area that may be affected by a vehicle body in a case that the target vehicle is in a stationary state, which may be determined according to attribute information of the target vehicle. The attribute information may include a vehicle length and a vehicle width. The attribute information may be pre-stored in the control platform. Alternatively, the attribute information may be stored in a specified database, and the control platform acquires the attribute information of the target vehicle from the database when needed. Finally, the state of each of the stationary right-of-way nodes in the stationary right-of-way node sequence is set to the occupied state, to avoid using the stationary right-of-way node by another vehicle and causing a conflict between the another vehicle and the target vehicle.

Figure 11:
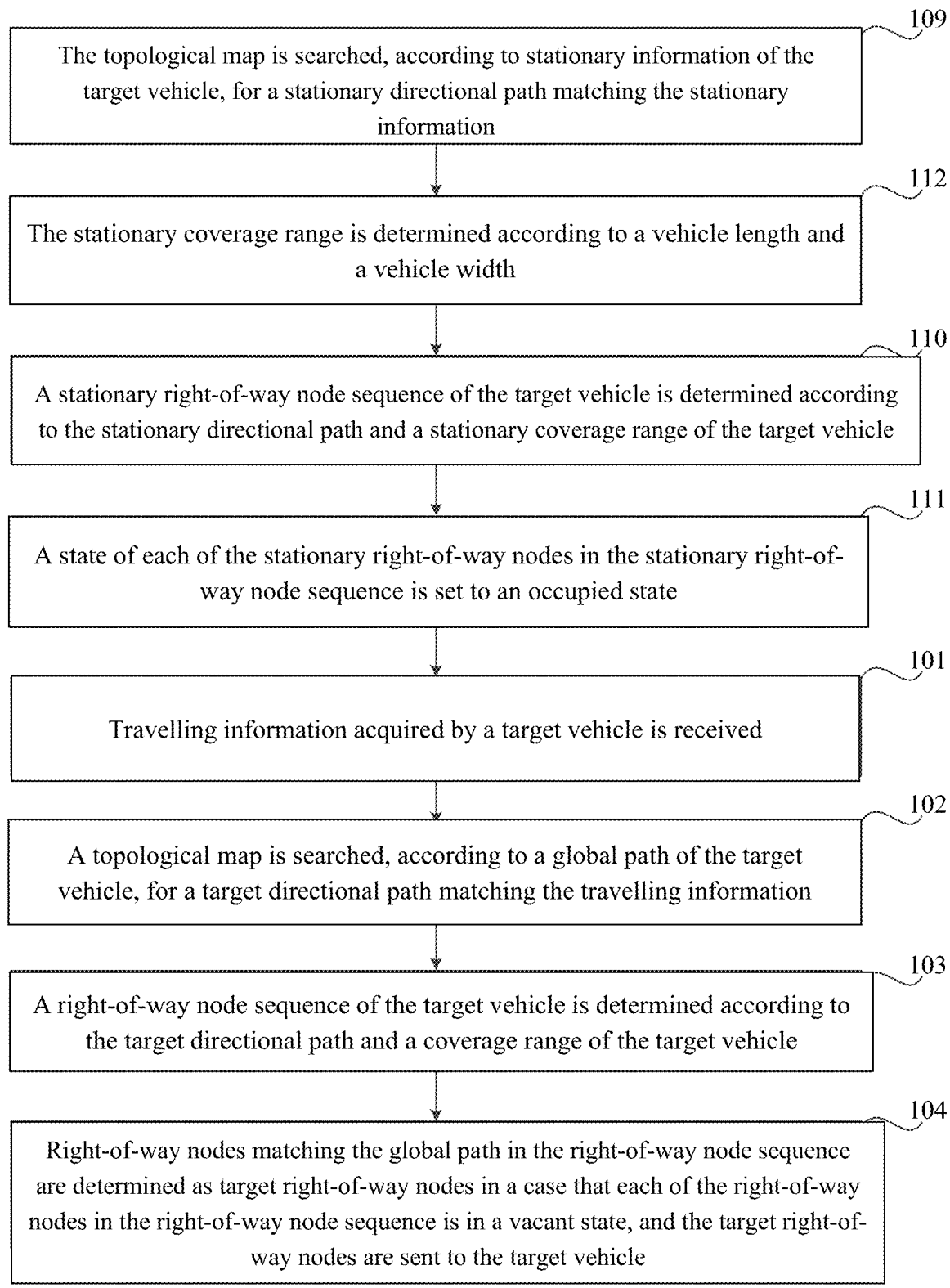
FIG. 11 is a flowchart of a vehicle scheduling method according to another embodiment.

FIG. 11 is a flowchart of another vehicle scheduling method according to an embodiment. As shown in FIG. 11, before step 110, the method further includes following steps:

Step 112: The stationary coverage range is determined according to a vehicle length and a vehicle width.

Specifically, the stationary coverage range may be a range covered by an entire vehicle body of the target vehicle, that is, a rectangular region taking a body length as a length and taking a body width as a width. Further, to improve the safety of controlling the target vehicle, a specific distance range may be added based on the coverage range of the vehicle body. For example, a redundancy of 300 mm may be added to the body length and a redundancy of 200 mm may be added to the body width, to be used as the stationary coverage range.

Based on the above, in the present disclosure, travelling information acquired by a target vehicle is first received, a topological map is searched, according to a global path of the target vehicle, for a target directional path matching the travelling information, then a right-of-way node sequence including multiple right-of-way nodes is determined according to the target directional path and a coverage range of the target vehicle, and finally, in a case that each of the right-of-way nodes in the right-of-way node sequence is in a vacant state, target right-of-way nodes conforming to the global path are sent to the target vehicle to control the target vehicle to travel according to the target right-of-way nodes. According to the present disclosure, a corresponding position of a vehicle on a topological map is determined according to travelling information of the vehicle, so that a right-of-way node sequence can be occupied by the vehicle on the topological map is determined, and in a case that each right-of-way node in the right-of-way node sequence is not occupied, the vehicle is controlled to travel according to target right-of-way nodes in the right-of-way node sequence conforming to a global path. Based on the global path, a travelling path can be adjusted for each vehicle in real time without prejudging whether there is a conflict between vehicles to avoid the risk, thereby reducing a degree of coupling between the vehicles and improving usage efficiency of the path.

Figure 12:
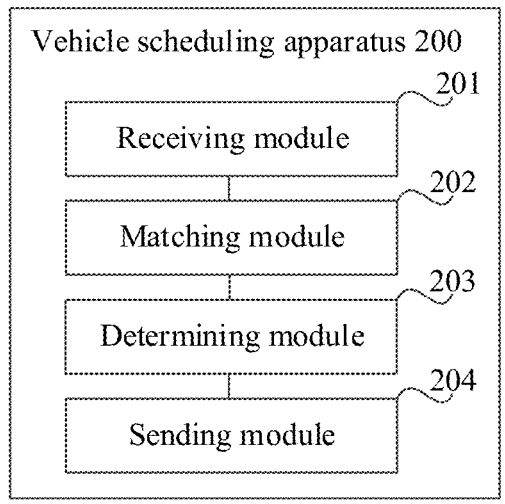
FIG. 12 is a block diagram of a vehicle scheduling apparatus according to an embodiment.

FIG. 12 is a block diagram of a vehicle scheduling apparatus according to an embodiment. As shown in FIG. 12, the apparatus 200 includes:

a receiving module 201, configured to receive travelling information acquired by a target vehicle;

a matching module 202, configured to search, according to a global path of the target vehicle, a topological map for a target directional path matching the travelling information;

a determining module 203, configured to determine a right-of-way node sequence of the target vehicle according to the target directional path and a coverage range of the target vehicle, where the right-of-way node sequence includes a plurality of right-of-way nodes, and the right-of-way nodes are nodes on the topological map; and a sending module 204, configured to determine right-of-way nodes matching the global path in the right-of-way node sequence as target right-of-way nodes in a case that each of the right-of-way nodes in the right-of-way node sequence is in a vacant state, and send the target right-of-way nodes to the target vehicle, so that the target vehicle to travels according to a path indicated by the target right-of-way nodes.

In an embodiment, the apparatus 200 may further repeatedly perform the steps performed by the receiving module 201, the matching module 202, the determining module 203, and the sending module 204 according to a preset scheduling period, that is, repeatedly performing following steps according to a scheduling period: receiving travelling information acquired by a target vehicle; searching, according to a global path of the target vehicle, a topological map for a target directional path matching the travelling information; determining a right-of-way node sequence of the target vehicle according to the target directional path and a coverage range of the target vehicle; and determining right-of-way nodes matching the global path in the right-of-way node sequence as target right-of-way nodes in a case that each of the right-of-way nodes in the right-of-way node sequence is in a vacant state, and sending the target right-of-way nodes to the target vehicle.

In an embodiment, the determining module is further configured to perform following steps:

Step A): Attribute information of the target vehicle is acquired from a preset database before the determining the right-of-way node sequence of the target vehicle according to the target directional path and the coverage range of the target vehicle, where the attribute information includes: a vehicle length, a vehicle width, a maximum speed, and a maximum braking distance of the target vehicle.

Step B): A coverage length is determined according to the vehicle length, the maximum speed, and the maximum braking distance, and a coverage width is determined according to the vehicle width.

Step C): The coverage range is determined according to the coverage length and the coverage width.

Figure 13:
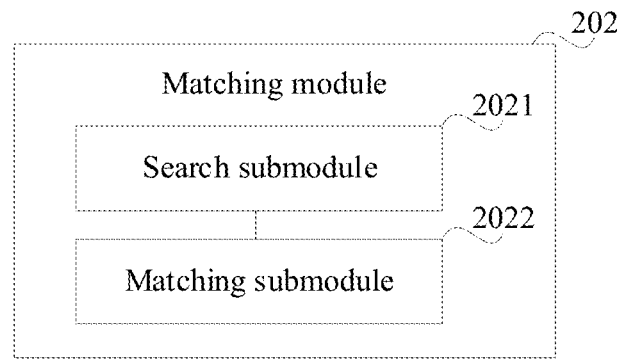
FIG. 13 is a block diagram of a vehicle scheduling apparatus according to another embodiment.

FIG. 13 is another block diagram of a vehicle scheduling apparatus according to an embodiment. As shown in FIG. 13, the travelling information includes a current position coordinate, travelling angle, and travelling direction of the target vehicle. The matching module 202 includes:
- a search submodule 2021, configured to search the topological map for a target node, where a Euclidean distance between the target node and the position coordinate is the shortest; and
- a matching submodule 2022, configured to determine the target directional path from at least one adjacent path of the target node according to the global path, the travelling angle, and the travelling direction.

In an embodiment, the matching submodule 2022 is configured to:
determine the first adjacent path as the target directional path in a case that a first adjacent path exists in the at least one adjacent path, where the first adjacent path belongs to the global path, a direction of the first adjacent path matches the travelling direction, and a distance between the position coordinate and the first adjacent path is less than a first distance threshold.

First alarm information is issued in a case that the first adjacent path does not exist in the at least one adjacent path, where the first alarm information indicates that a position of the target vehicle is abnormal.

In an embodiment, the determining module 203 is configured to:
determine nodes at two ends of the target directional path and nodes within the coverage range as the right-of-way node sequence.

Figure 14:
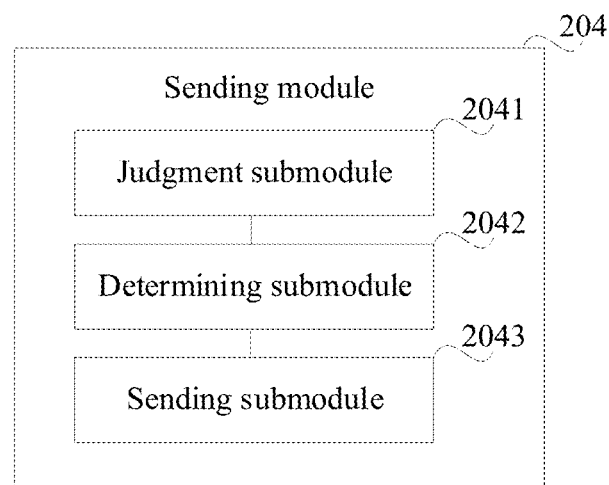
FIG. 14 is a block diagram of a vehicle scheduling apparatus according to another embodiment.

FIG. 14 is another block diagram of a vehicle scheduling apparatus according to an embodiment. As shown in FIG. 14, the sending module 204 may include:
- a judgment submodule 2041, configured to set a state of each of the right-of-way nodes to an occupied state in a case that each of the right-of-way nodes in the right-of-way node sequence is in the vacant state;
- the judgment submodule 2041 is further configured to sequentially determine whether each of the right-of-way nodes in the right-of-way node sequence belongs to the global path;
- a determining submodule 2042, configured to determine right-of-way nodes that belong to the global path as the target right-of-way nodes; and
- a sending submodule 2043, configured to send the target right-of-way nodes to the target vehicle in an order of the right-of-way node sequence.

In an embodiment, the sending module 204 is further configured to:
send historical target right-of-way nodes to the target vehicle in a case that there is a first right-of-way node in an occupied state in the right-of-way node sequence, so that the target vehicle travels according to a path indicated by the historical target right-of-way nodes, where the historical target right-of-way nodes are target right-of-way nodes sent to the target vehicle in a last scheduling period, and the first right-of-way node is any one of the right-of-way nodes in the right-of-way node sequence.

In an embodiment, the sending module 204 is further configured to perform following steps:

Step D): An adjacent vehicle occupying the first right-of-way node is determined in a case that there is a first right-of-way node in an occupied state in the right-of-way node sequence.

Step E): Whether a deadlock exists between the historical target right-of-way nodes and a global path of the adjacent vehicle is determined.

Step F): The historical target right-of-way nodes are sent to the target vehicle in a case that the deadlock does not exist between the historical target right-of-way nodes and the global path of the adjacent vehicle.

Step J): Second alarm information is issued in a case that the deadlock does exist between the historical target right-of-way nodes and the global path of the adjacent vehicle, where the second alarm information indicates that the global path of the target vehicle is abnormal.

Figure 15:
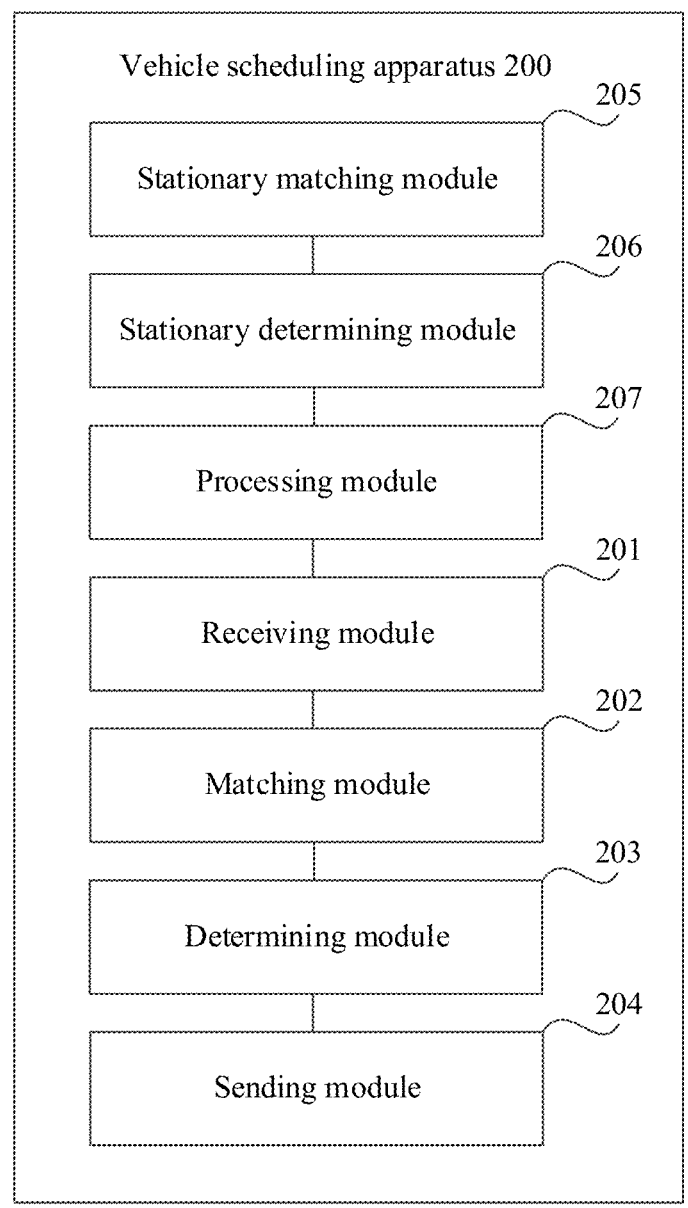
FIG. 15 is a block diagram of a vehicle scheduling apparatus according to another embodiment.

FIG. 15 is a block diagram of a vehicle scheduling apparatus according to another embodiment. As shown in FIG. 15, the apparatus 200 further includes:
- a stationary matching module 205, configured to search, according to stationary information of the target vehicle, the topological map for a stationary directional path matching the stationary information before the global path is allocated to the target vehicle, where the stationary information includes a stationary position and a stationary angle of the target vehicle;
- a stationary determining module 206, configured to determine a stationary right-of-way node sequence of the target vehicle according to the stationary directional path and a stationary coverage range of the target vehicle, where the stationary right-of-way node sequence includes a plurality of stationary right-of-way nodes, and the stationary right-of-way nodes are nodes on the topological map; and a processing module 207, configured to set a state of each of the stationary right-of-way nodes in the stationary right-of-way node sequence to an occupied state.

In an embodiment, the stationary determining module 206 is further configured to:

determine the stationary coverage range according to the vehicle length and the vehicle width before the determining the stationary right-of-way node sequence of the target vehicle according to the stationary directional path and the stationary coverage range of the target vehicle.

Specific manners in which the modules in the apparatus in the above embodiment perform the operations have been described in detail in the embodiment related to the method, which are not described in detail herein.

Based on the above, in the present disclosure, travelling information acquired by a target vehicle is first received, a topological map is searched, according to a global path of the target vehicle, for a target directional path matching the travelling information, then a right-of-way node sequence including multiple right-of-way nodes is determined according to the target directional path and a coverage range of the target vehicle, and finally, in a case that each of the right-of-way nodes in the right-of-way node sequence is in a vacant state, target right-of-way nodes conforming to the global path are sent to the target vehicle to control the target vehicle to travel according to the target right-of-way nodes. According to the present disclosure, a corresponding position of a vehicle on a topological map is determined according to travelling information of the vehicle, so that a right-of-way node sequence can be occupied by the vehicle on the topological map is determined. In a case that each right-of-way node in the right-of-way node sequence is not occupied, the vehicle is controlled to travel according to target right-of-way nodes in the right-of-way node sequence conforming to a global path. Based on the global path, a travelling path can be adjusted for each vehicle in real time without prejudging whether there is a conflict between vehicles to avoid the risk, thereby reducing a degree of coupling between the vehicles and improving usage efficiency of the path. The present disclosure further relates to a vehicle scheduling system, including at least one vehicle and a control platform. The control platform includes one or more processors and a storage apparatus configured to store one or more programs, the one or more programs, when executed by the one or more processors, causing the one or more processors to perform the steps of any one of the foregoing vehicle scheduling methods.

Specific manners in which the control platform in the foregoing embodiments performs the operations have been described in detail in the embodiments related to the vehicle scheduling method, which are not described in detail herein.

Based on the above, in the present disclosure, travelling information acquired by a target vehicle is received, a topological map is searched, according to a global path of the target vehicle, for a target directional path matching the travelling information, then a right-of-way node sequence including multiple right-of-way nodes is determined according to the target directional path and a coverage range of the target vehicle, and finally, in a case that each of the right-of-way nodes in the right-of-way node sequence is in a vacant state, target right-of-way nodes conforming to the global path are sent to the target vehicle to control the target vehicle to travel according to the target right-of-way nodes. According to the present disclosure, a corresponding position of a vehicle on a topological map is determined according to the travelling information of the vehicle, so that a right-of-way node sequence can be occupied by the vehicle on the topological map is determined, and in a case that each right-of-way node in the right-of-way node sequence is not occupied, the vehicle is controlled to travel according to target right-of-way nodes in the right-of-way node sequence conforming to a global path. Based on the global path, a travelling path can be adjusted for each vehicle in real time without prejudging whether there is a conflict between vehicles to avoid the risk, thereby reducing a degree of coupling between the vehicles and improving usage efficiency of the path.

Implementations of the present disclosure are described in detail above with reference to the accompanying drawings, but the present disclosure is not limited to the specific details in the above implementations. Various simple variations may be made to the technical solutions of the present disclosure within the scope of the technical idea of the present disclosure, and such simple variations shall all fall within the protection scope of the present disclosure.

Additionally, it should be noted that, the specific technical features described in the above specific implementations may be combined in any suitable manner without contradiction. To avoid unnecessary repetition, various possible combinations are not further described in the present disclosure.

In addition, different implementations of the present disclosure may also be arbitrarily combined without departing from the idea of the present disclosure, and these combinations shall still be regarded as content disclosed in the present disclosure.

What is claimed is:

1. A vehicle scheduling method, comprising:

for each preset scheduling period of about 100 millisecond:

acquiring travelling information by a positioning apparatus on a target vehicle, wherein the travelling information comprises a current position coordinate, a travelling angle, and a travelling direction of the target vehicle, wherein the positioning apparatus is a lidar, a two-dimensional label, or a inertial navigation system, and wherein the target vehicle is an automated guided vehicle;

transmitting the travelling information acquired by the target vehicle to a control platform through a gateway protocol, WLAN, telematics, V2X, or 4G or 5G mobile communication technology;

searching, according to a global path of the target vehicle, a topological map to obtain a current directional path matching the travelling information, wherein the global path indicates a travelling path from an origin to a destination for the target vehicle;

acquiring, at the control platform, attribute information of the target vehicle from the database, wherein the attribute information comprises: a vehicle length, a vehicle width, a maximum speed, and a maximum braking distance of the target vehicle;

determining, at the control platform, a coverage length according to the vehicle length, the maximum speed, and the maximum braking distance, and determining a coverage width according to the vehicle width; and determining, at the control platform, a coverage range according to the coverage length and the coverage width;

determining a right-of-way node sequence of the target vehicle according to the current directional path and THE coverage range of the target vehicle, wherein the right-of-way node sequence comprises a plurality of right-of-way nodes on the topological map;

determining whether each of the right-of-way nodes in the right-of-way node sequence is in a vacant state, wherein the vacant state of a right-of-way node indicates no vehicle occupies the right-of-way node;

and in response to determining that each of the right-of-way nodes in the right-of-way node sequence is in the vacant state, determining right-of-way nodes matching the global path as target right-of-way nodes;

controlling the target vehicle to travel according to a path indicated by the target right-of-way nodes by sending the target right-of-way nodes to the target vehicle;

and controlling the target vehicle to stop travelling in response to a determination that the travelling information acquired by the target vehicle is incorrect.

2. The method according to claim 1, wherein
the searching, according to the global path of the target vehicle, the topological map to obtain the current directional path matching the travelling information comprises:

searching the topological map for a target node, wherein a Euclidean distance between the target node and the current position coordinate is the shortest; and determining the current directional path from at least one adjacent path of the target node according to the global path, the travelling angle, and the travelling direction.

3. The method according to claim 2, wherein the determining the current directional path from the at least one adjacent path of the target node according to the global path, the travelling angle, and the travelling direction comprises:

determining whether the at least one adjacent path comprises a first adjacent path, wherein the first adjacent path belongs to the global path, a direction of the first adjacent path matches the travelling direction, and a distance between the current position coordinate and the first adjacent path is less than a first distance threshold;

in response to determining that the at least one adjacent path comprises the first adjacent path, determining the first adjacent path as the current directional path; and in response to determining that the at least one adjacent path does not comprise the first adjacent path, issuing first alarm information, wherein the first alarm information indicates that a position of the target vehicle is abnormal.

4. The method according to claim 3, the method further comprises:

in response to determining that the at least one adjacent path does not comprise the first adjacent path, determination that the travelling information acquired by the target vehicle is incorrect.

5. The method according to claim 1, wherein the determining the right-of-way node sequence of the target vehicle according to the current directional path and the coverage range of the target vehicle comprises:

determining right-of-way nodes at two ends of the current directional path and right-of-way nodes within the coverage range as the right-of-way nodes of the right-of-way node sequence.

6. The method according to claim 1, wherein the determining the right-of-way nodes matching the global path as the target right-of-way nodes, and sending the target right-of-way nodes to the target vehicle comprises:

setting a state of each of the right-of-way nodes to an occupied state;

determining whether each of the right-of-way nodes in the right-of-way node sequence belongs to the global path;

determining right-of-way nodes that belong to the global path as the target right-of-way nodes; and sending the target right-of-way nodes to the target vehicle.

7. The method according to claim 1, further comprising:

determining whether a first right-of-way node in the right-of-way node sequence is in an occupied state, and in response to determining that the first right-of-way node in the right-of-way node sequence is in an occupied state, determining that an adjacent vehicle occupies the first right-of-way node;

determining whether a deadlock exists between historical target right-of-way nodes and a global path of the adjacent vehicle, wherein the historical target right-of-way nodes are target right-of-way nodes sent to the target vehicle in a last scheduling period; and in response to determining that the deadlock does not exist between the historical target right-of-way nodes and the global path of the adjacent vehicle, sending the historical target right-of-way nodes to the target vehicle to enable the target vehicle to travel according to a path indicated by the historical target right-of-way nodes.

8. The method according to claim 1, further comprising:

determining whether a first right-of-way node in the right-of-way node sequence is in an occupied state, and in response to determining that the first right-of-way node in the right-of-way node sequence is in an occupied state, determining that an adjacent vehicle occupies the first right-of-way node;

determining whether a deadlock exists between historical target right-of-way nodes and a global path of the adjacent vehicle, the historical target right-of-way nodes are target right-of-way nodes sent to the target vehicle in a last scheduling period; and issuing second alarm information in response to determining that the deadlock exists between the historical target right-of-way nodes and the global path of the adjacent vehicle, wherein the second alarm information indicates that the global path of the target vehicle is abnormal.

9. The method according to claim 1, wherein before the global path is allocated to the target vehicle, the method further comprises:

searching, according to stationary information of the target vehicle, the topological map to obtain a stationary directional path matching the stationary information, wherein the stationary information comprises a stationary position and a stationary angle of the target vehicle;

determining a stationary right-of-way node sequence of the target vehicle according to the stationary directional path and a stationary coverage range of the target vehicle, wherein the stationary right-of-way node sequence comprises a plurality of stationary right-of-way nodes on the topological map;

and setting a state of each of the stationary right-of-way nodes in the stationary right-of-way node sequence to an occupied state.

10. The method according to claim 9, wherein before the determining the stationary right-of-way node sequence of the target vehicle according to the stationary directional path and the stationary coverage range of the target vehicle, the method further comprises:

determining the stationary coverage range according to the vehicle length and the vehicle width.

11. A vehicle scheduling apparatus, comprising:
a processor;
a database;
and a memory for storing machine-executable instructions, wherein by reading and executing the machine-executable instructions stored in the memory, the processor is configured to perform operations comprising:
for each preset scheduling period of about 100 millisecond:
receiving travelling information acquired by a target vehicle through a gateway protocol, WLAN, telematics, V2X, or 4G or 5G mobile communication technology, wherein the travelling information comprises a current position coordinate, a travelling angle, and a travelling direction of the target vehicle, and wherein the target vehicle is an automated guided vehicle;
searching, according to a global path of the target vehicle, a topological map to obtain a current directional path matching the travelling information, wherein the global path indicates a travelling path from an origin to a destination for the target vehicle;
acquiring attribute information of the target vehicle from the database, wherein the attribute information comprises: a vehicle length, a vehicle width, a maximum speed, and a maximum braking distance of the target vehicle;
determining a coverage length according to the vehicle length, the maximum speed, and the maximum braking distance, and determining a coverage width according to the vehicle width;
and determining a coverage range according to the coverage length and the coverage width;
determining a right-of-way node sequence of the target vehicle according to the current directional path and the coverage range of the target vehicle, wherein the right-of-way node sequence comprises a plurality of right-of-way nodes on the topological map;
determining whether each of the right-of-way nodes in the right-of-way node sequence is in a vacant state, wherein the vacant state of a right-of-way node indicates no vehicle occupies the right-of-way node;
and in response to determining that each of the right-of-way nodes in the right-of-way node sequence is in the vacant state, determining right-of-way nodes matching the global path as target right-of-way nodes, and controlling the target vehicle to travel according to a path indicated by the target right-of-way nodes by sending the target right-of-way nodes to the target vehicle.

12. The apparatus according to claim 11, wherein the searching, according to the global path of the target vehicle, the topological map to obtain the current directional path matching the travelling information comprises:
searching the topological map for a target node, wherein a Euclidean distance between the target node and the current position coordinate is the shortest; and
determining the current directional path from at least one adjacent path of the target node according to the global path, the travelling angle, and the travelling direction.

13. The apparatus according to claim 12, wherein the determining the current directional path from the at least one adjacent path of the target node according to the global path, the travelling angle, and the travelling direction comprises:
determining whether the at least one adjacent path comprises a first adjacent path, wherein the first adjacent path belongs to the global path, a direction of the first adjacent path matches the travelling direction, and a distance between the current position coordinate and the first adjacent path is less than a first distance threshold;
in response to determining that the at least one adjacent path comprises the first adjacent path, determining the first adjacent path as the current directional path; and
in response to determining that the at least one adjacent path does not comprise the first adjacent path, issuing first alarm information, wherein the first alarm information indicates that a position of the target vehicle is abnormal.

14. The apparatus according to claim 11, wherein the determining the right-of-way node sequence of the target vehicle according to the current directional path and the coverage range of the target vehicle comprises:
determining right-of-way nodes at two ends of the current directional path and right-of-way nodes within the coverage range as the right-of-way nodes of the right-of-way node sequence.

15. A vehicle scheduling system, comprising an automated guided vehicle (AGV) and a control platform,
wherein a positioning apparatus selected from a lidar, a two-dimensional code label, and an inertial navigation system is configured on the AGV,
wherein the control platform and the AGV are configured to communicate through a gateway protocol, WLAN, telematics, V2X, or 4G or 5G mobile communication technology, and
wherein the control platform comprises:
one or more processors; and
a storage apparatus, configured to store a database and one or more programs,
wherein the one or more programs, when executed by the one or more processors, cause the one or more processors to perform operations comprising:
for each preset scheduling period of about 100 millisecond:
receiving travelling information acquired by the positioning apparatus on the AGV, wherein the travelling information comprises a current position coordinate, a travelling angle, and a travelling direction of the AGV;
searching, according to a global path of the AGV, a topological map to obtain a current directional path matching the travelling information, wherein the global path indicates a travelling path from an origin to a destination for the AGV;
acquiring attribute information of the AGV from the database, wherein the attribute information comprises: a vehicle length, a vehicle width, a maximum speed, and a maximum braking distance of the AGV;
determining a coverage length according to the vehicle length, the maximum speed, and the maximum braking distance, and determining a coverage width according to the vehicle width; and determining a coverage range according to the coverage length and the coverage width
determining a right-of-way node sequence of the AGV according to the current directional path and the coverage range of the AGV, wherein the right-of-way node sequence comprises a plurality of right-of-way nodes on the topological map;
determining whether each of the right-of-way nodes in the right-of-way node sequence is in a vacant state, wherein the vacant state of a right-of-way node indicates no vehicle occupies the right-of-way node; and in response to determining that each of the right-of-way nodes in the right-of-way node sequence is in the vacant state, determining right-of-way nodes matching the global path as target right-of-way nodes, and controlling the AGV to travel according to a path indicated by the target right-of-way nodes by sending the target right-of-way nodes to the AGV.

16. The system according to claim 15, wherein the searching, according to the global path of the AGV, the topological map to obtain the current directional path matching the travelling information comprises:

searching the topological map for a target node, wherein a Euclidean distance between the target node and the current position coordinate is the shortest; and determining the current directional path from at least one adjacent path of the target node according to the global path, the travelling angle, and the travelling direction.

17. The system according to claim 16, wherein the determining the current directional path from the at least one adjacent path of the target node according to the global path, the travelling angle, and the travelling direction comprises:

determining whether the at least one adjacent path comprises a first adjacent path, wherein the first adjacent path belongs to the global path, a direction of the first adjacent path matches the travelling direction, and a distance between the current position coordinate and the first adjacent path is less than a first distance threshold;

in response to determining that the at least one adjacent path comprises the first adjacent path, determining the first adjacent path as the current directional path; and in response to determining that the at least one adjacent path does not comprise the first adjacent path, issuing first alarm information, wherein the first alarm information indicates that a position of the AGV is abnormal.

18. The system according to claim 15, wherein the determining the right-of-way node sequence of the AGV according to the current directional path and the coverage range of the AGV comprises:

determining right-of-way nodes at two ends of the current directional path and right-of-way nodes within the coverage range as the right-of-way nodes of the right-of-way node sequence.

* * * * *